US012630985B2

(12) United States Patent
Cole et al.

(10) Patent No.: US 12,630,985 B2
(45) Date of Patent: May 19, 2026

(54) GRINDING MACHINE ADAPTABLE TO GROUND CONTOURS

(71) Applicant: CORNING RESEARCH & DEVELOPMENT CORPORATION, Corning, NY (US)

(72) Inventors: Brian Matthew Cole, Austin, TX (US); David Montalion Dupuis, Cedar Park, TX (US); Cary Alan Kipke, Pflugerville, TX (US); Donald Kent Larson, Cedar Park, TX (US); Zachary Michael Thompson, Austin, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 727 days.

(21) Appl. No.: 18/086,909

(22) Filed: Dec. 22, 2022

(65) Prior Publication Data

US 2023/0117834 A1 Apr. 20, 2023

Related U.S. Application Data

(63) Continuation of application No. PCT/US2021/038565, filed on Jun. 23, 2021.

(Continued)

(51) Int. Cl.
*E01C 23/09* (2006.01)
*G01B 21/18* (2006.01)

(52) U.S. Cl.
CPC .......... *E01C 23/0946* (2013.01); *G01B 21/18* (2013.01)

(58) Field of Classification Search
CPC .. E01C 23/0946; E01C 23/09; E01C 23/0933; E01C 23/0993; G01B 21/18
See application file for complete search history.

(56) References Cited

U.S. PATENT DOCUMENTS

| | | | | | |
|---|---|---|---|---|---|
| 2,349,949 | A | * | 5/1944 | Farrell | E01C 23/0946 404/94 |
| 3,451,721 | A | * | 6/1969 | Speirs | E01C 23/0946 125/5 |

(Continued)

FOREIGN PATENT DOCUMENTS

| | | |
|---|---|---|
| EP | 0310074 B1 | 5/1992 |
| GB | 2512945 A | 10/2014 |

(Continued)

OTHER PUBLICATIONS

Extended European Search Report, EP application No. 21832607.2, dated Nov. 19, 2024, 15 pages, European Patent Office.

(Continued)

*Primary Examiner* — Abigail A Risic
(74) *Attorney, Agent, or Firm* — William D. Doyle

(57) ABSTRACT

Vehicle mounted grinding machines adaptable to ground contours have a vehicle mount configured to attach a housing body, including a grinding drum to a vehicle. The vehicle may include a pair of guides on opposing sides of a blade set of a grinding drum, where each of the pair of guides is horizontally aligned with the grinding drum. The housing body is configured to roll about a travel direction relative to the vehicle mount and the grinding machine includes an alignment motor configured to laterally translate the housing body relative to the vehicle mount and perpendicular to a travel direction.

15 Claims, 11 Drawing Sheets

Related U.S. Application Data

(60) Provisional application No. 63/046,220, filed on Jun. 30, 2020.

(56) References Cited

U.S. PATENT DOCUMENTS

| | | | |
|---|---|---|---|
| 3,606,467 A | | 9/1971 | Christensen et al. |
| 3,606,469 A | | 9/1971 | Hughes |
| 4,900,094 A | * | 2/1990 | Sergeant ................. B27B 33/20 |
| | | | 404/90 |
| 5,315,770 A | | 5/1994 | Campbell |
| 5,378,081 A | | 1/1995 | Swisher |
| 5,382,084 A | | 1/1995 | Diver et al. |
| 5,626,197 A | * | 5/1997 | Tseng ................... E01C 23/082 |
| | | | 172/554 |
| 5,882,086 A | | 3/1999 | Bremner et al. |
| 6,171,017 B1 | | 1/2001 | Watkins |
| 6,227,620 B1 | | 5/2001 | Page |
| 8,002,360 B2 | * | 8/2011 | Cochran .............. E01C 23/088 |
| | | | 299/39.6 |
| 2008/0008527 A1 | * | 1/2008 | Kraemer .............. E01C 23/088 |
| | | | 404/94 |
| 2008/0246328 A1 | | 10/2008 | Mannebach et al. |
| 2009/0232598 A1 | | 9/2009 | Cochran et al. |
| 2015/0132059 A1 | | 5/2015 | Johnson |
| 2017/0362784 A1 | * | 12/2017 | Hoffmann ............. E01C 23/127 |
| 2018/0282954 A1 | | 10/2018 | Berning et al. |
| 2019/0210634 A1 | | 7/2019 | Haroldsen et al. |
| 2020/0130230 A1 | * | 4/2020 | Boersch ................. E01C 23/09 |
| 2020/0141071 A1 | | 5/2020 | Risi |
| 2023/0250597 A1 | * | 8/2023 | Abresch ............... E01C 23/088 |
| | | | 299/39.6 |

FOREIGN PATENT DOCUMENTS

| | | |
|---|---|---|
| WO | 2014/167319 A2 | 10/2014 |
| WO | 2019/202567 A1 | 10/2019 |

OTHER PUBLICATIONS

International Search Report and Written Opinion of the International Searching Authority; PCT/US21/038565; Mailed Dec. 15, 2021; 13 Pages; Commissioner for Patents.

Invitation To Pay Additional Fees of the International Searching Authority; PCT/US21/038565; Mailed Sep. 1, 2021; 2 Pages; Commissioner for Patents.

* cited by examiner

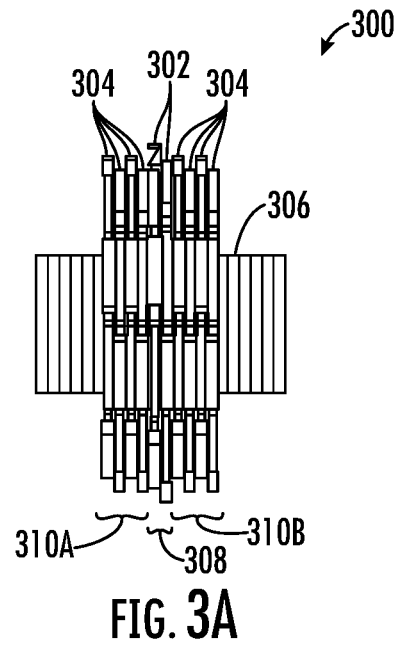
FIG. 3A
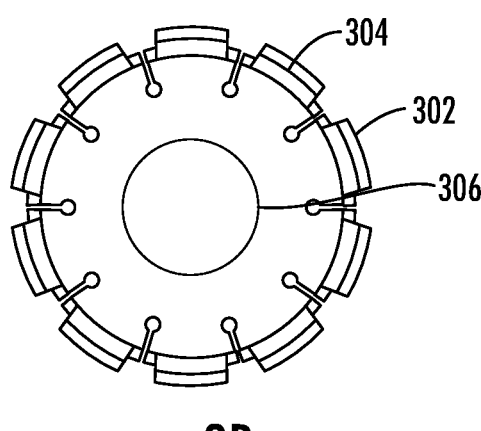
FIG. 3B

GRINDING MACHINE ADAPTABLE TO GROUND CONTOURS

PRIORITY APPLICATION

This application is a continuation of International Patent Application No. PCT/US2021/038565 filed Jun. 23, 2021, which claims the benefit of priority to U.S. Provisional Application Ser. No. 63/046,220 filed on Jun. 30, 2020, the content of which is relied upon and incorporated herein by reference in its entirety.

BACKGROUND

The present disclosure relates to a grinding machine. In particular, the present disclosure relates to a grinding machine (e.g., vehicle mounted) adaptable to ground contours.

Fiber to the premises (FTTP) has increased in popularity as improvements in micro-trenching have provided greater reliability and increased efficiency. However, micro-trenching often requires removal of large amounts of material with large and expensive equipment that limits micro-trench locations (e.g., curbs) and results in substantial debris that requires frequent and costly disposal. Alternatively, other processes may be used to form a nano-trench in the pavement, position a fiber optic cable therein, and cover with road tape, which reduces the time and cost of deploying fiber networks.

Such processes are often limited in the creation of a consistent and precise nano-trench due to a limit in controlling the size and shape of the nano-trench. This may produce vulnerabilities in the fiber optic cable and/or road tape. For example, FIG. 1 is a side view of a grinding machine 100 with a grinding drum 102 positioned between a front wheel 104 and rear wheels 106. Such a configuration produces a grind of a desired depth when traveling over a flat surface 108, but produces a shallow grind when traveling over a valley 108' between the front wheel and the rear wheels and produces a deep grind when traveling over a crest 108" between the front wheel 104 and the rear wheels 106. In other words, the grinding machine 100 cannot adequately adapt to road contours to produce a consistent nano-trench depth because of the horizontal offset of the axis of the wheels 104, 106 from the axis of the grinding drum 102. Accordingly, such grinding machines cannot produce consistent and precise nano-trenches over a wide variety of road contours or other terrain.

SUMMARY

One embodiment of the disclosure relates to a grinding machine, including a housing body, a grinding drum, and a pair of guides. The grinding drum includes an axle and a blade set mounted thereto. The axle is rotatably coupled to the housing body. The pair of guides are on opposing sides of the blade set. Each of the pairs of guides is horizontally aligned with the grinding drum.

An additional embodiment of the disclosure relates to a grinding machine, including a housing body, a vehicle mount, and a grinding drum. The vehicle mount is attached to the housing body and is configured to attach the housing body to a vehicle. The grinding drum includes an axle and a blade set mounted thereto. The axle is rotatably coupled to the housing body. The housing body is configured to roll about a travel direction relative to the vehicle mount.

An additional embodiment of the disclosure relates to a grinding machine, including a housing body, a vehicle mount, a grinding drum, and an alignment motor. The vehicle mount is attached to the housing body and is configured to attach the housing body to a vehicle. The grinding drum includes an axle and a blade set mounted thereto. The axle is rotatably coupled to the housing body. The alignment motor is configured to laterally translate the housing body relative to the vehicle mount and perpendicular to a travel direction.

Additional features and advantages will be set out in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary and are intended to provide an overview or framework to understanding the nature and character of the claims. The accompanying drawings are included to provide a further understanding and are incorporated in and constitute a part of this specification. The drawings illustrate one or more embodiment(s), and together with the description, serve to explain principles and operation of the various embodiments.

BRIEF DESCRIPTION OF THE DRAWINGS

FIG. 3A is a front view of one embodiment of the grinding drum of FIGS. 2A-2B.

FIG. 3B is a side view of the grinding drum of FIG. 3A.

DETAILED DESCRIPTION

Figure 1:
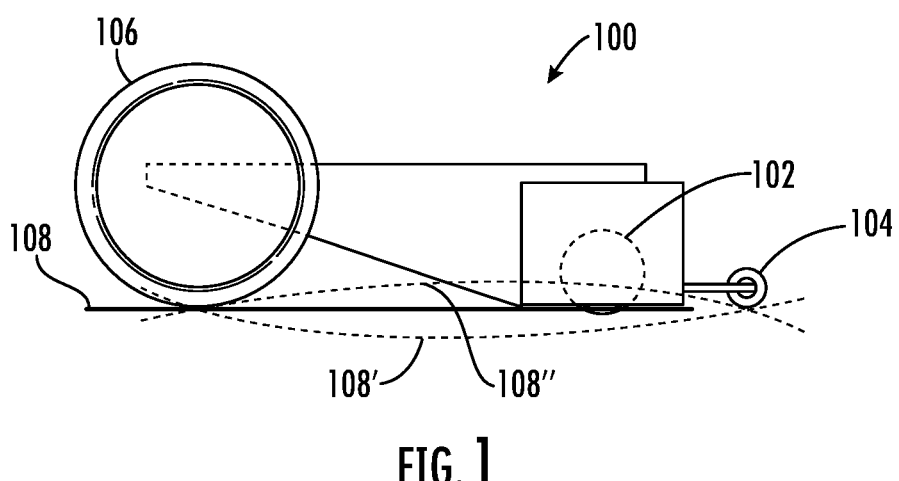
FIG. 1 is a side view of a grinding machine with a grinding drum positioned between a front wheel and rear wheels.

Reference will now be made in detail to the presently preferred embodiments, examples of which are illustrated in the accompanying drawings. Whenever possible, the same reference numerals will be used throughout the drawings to refer to the same or like parts.

The embodiments set out below represent the information to enable those skilled in the art to practice the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The use herein of ordinals in conjunction with an element is solely for distinguishing what might otherwise be similar or identical labels, such as "first layer" and "second layer," and does not imply a priority, a type, an importance, or other attribute, unless otherwise stated herein.

The term "about" used herein in conjunction with a numeric value means any value that is within a range of ten percent greater than or ten percent less than the numeric value.

As used herein, the articles "a" and "an" in reference to an element refers to "one or more" of the element unless otherwise explicitly specified. The word "or" as used herein is inclusive unless contextually impossible. For example, the recitation of A or B means A, or B, or both A and B.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

The use herein of "proximate" means at, next to, or near.

The terms "left," "right," "top," "bottom," "front," "back," "horizontal," "parallel," "perpendicular," "vertical," "lateral," "coplanar," and similar terms are used for convenience of describing the attached figures and are not intended to limit this disclosure. For example, the terms "left side" and "right side" are used with specific reference to the drawings as illustrated, and the embodiments may be in other orientations in use. Further, as used herein, the terms "horizontal," "parallel," "perpendicular," "vertical," "lateral," etc., include slight variations that may be present in working examples.

Figure 2A:
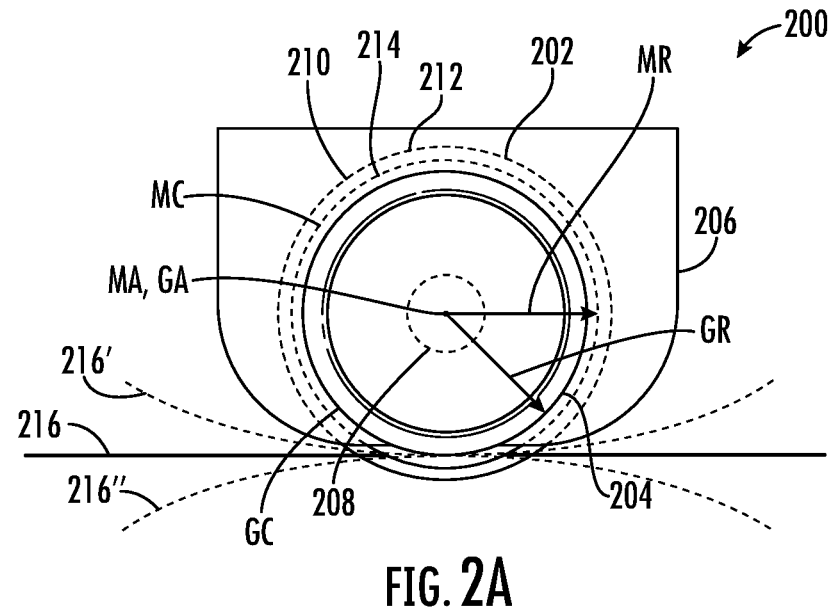
FIG. 2A is a side view of a grinding apparatus with a grinding drum positioned between and horizontally aligned with two guides.
Figure 2B:
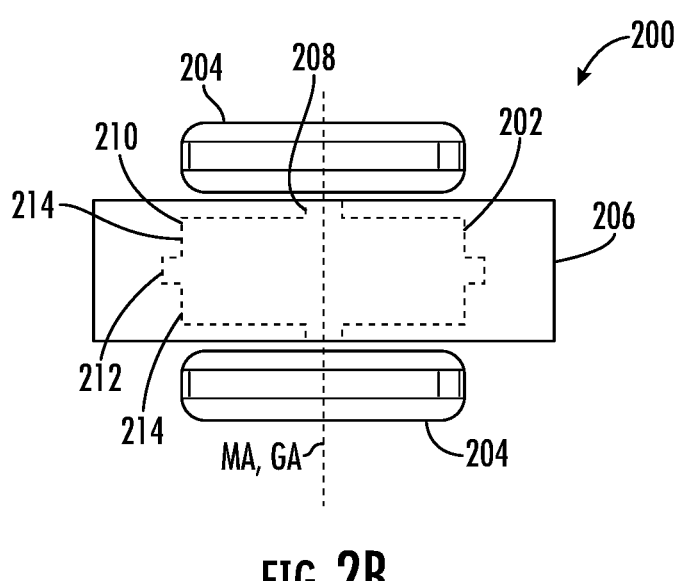
FIG. 2B is a top view of the grinding apparatus of FIG. 2A.

FIGS. 2A-2B are views of a grinding apparatus 200 with a grinding drum 202 positioned between and horizontally aligned with a pair of guides 204. In certain embodiments, the grinding apparatus 200 is a grinding machine or grinding tool including a housing 206 (e.g., grinding housing or housing body, etc.), the grinding drum 202, and the pair of guides 204. In certain embodiments, the grinding apparatus 200 includes a handle attached to the housing, such as used in a walk-behind handheld grinding tool. In certain embodiments, the grinding apparatus 200 includes a vehicle mount attached to the housing to attach the housing to a vehicle, such as in a vehicle mounted grinding machine pushed or pulled by a vehicle (e.g., motorized vehicle, truck, etc.).

The grinding drum 202 includes an axle 208 and a blade set 210 mounted thereto. The blade set 210 includes at least one channel blade 212 and a plurality of milling blades 214 on opposing sides of the at least one channel blade 212. The axle 208 is rotatably coupled to the housing 206. Rotation of the plurality of milling blades 214 defines a mill curvature MC and a mill radius MR about a mill axis MA.

The pair of guides 204 (e.g., pair of wheels, skis, etc.) are on opposing sides of the blade set 210. The pair of guides 204 is configured to limit a grinding depth of the grinding drum 202. Each of the pairs of guides 204 defines a guiding curvature GC and a guide radius GR about a guide axis GA. At least a portion of the guide curvature GC being generally concentric with the mill curvature MC. The guide radius GR is less than the mill radius MR. Each of the pairs of wheels is horizontally aligned with the grinding drum 202. The mill axis MA of the grinding drum 202 is aligned (e.g., horizontally and/or axially) with the guide axis GA of the pair of guides 204, such as within 10 mm. At least a portion of the guide curvature GC is generally concentric with the mill curvature MC. The guide radius GR is less than the mill radius MR.

Positioning of the pair of guides 204 along the MA of the grinding drum 202 maintains a consistent depth regardless of pavement contour. In particular, such a configuration maintains a grind of a desired depth when traveling over a flat surface 216, a valley 216', and/or a crest 216". The grinding apparatus 200 adapts to road contours to produce a consistent nano-trench depth because of the horizontal alignment of the guide axis GA of the pair of guides 204 from the mill axis MA of the grinding drum 202. The pair of guides 204 and the grinding drum 202 are on the same centerline and/or in the same plane. The grinding apparatus 200 (without relying on front and back wheels for support during grinding) provides a consistent and precise nano-trench (e.g., consistent depth) over a wide variety of road contours or other terrains regardless of surface irregularities or variations (e.g., uneven surfaces, undulating surfaces, crests, valleys, road contours, curb contours, etc.).

FIGS. 3A-3B are views of one embodiment of the grinding drum 202 of FIGS. 2A-2B. Grinding drum 300 provides for simultaneously milling both a channel and a recessed area on either side of the channel in a single pass. At least one channel blade 302 and a plurality of milling blades 304 are mounted on a blade axle 306. In certain embodiments, the at least one channel blade 302 and/or the plurality of milling blades 304 are diamond-tipped, which provides for longer wear and fasting cutting. The at least one channel blade 302 is centered on the blade axle 306, and at least one milling blade 304 of the plurality of milling blades 304 is mounted on each side of the at least one channel blade 302. The at least one channel blade 302 and/or plurality of milling blades 304 fit securely on the blade axle 306. The at least one channel blade 302 has a larger radius than the plurality of milling blades 304 to provide a predetermined depth of the channel relative to the recess.

In certain embodiments, the at least one channel blade 302 includes a set 308 of channel blades 302 centrally mounted on the blade axle 306, the plurality of milling blades 304 includes a first set 310A of four milling blades 304 mounted directly on one side of the set 308 of the channel blades 302, and a second set 310B of four milling blades are mounted on the other side of the set 308 of channel blades 302. Of course, more or fewer channel blades 302 and/or milling blades 304 may be used depending on the application.

In certain embodiments, the set 308 of channel blades 302 includes only one channel blade 302 (e.g., 0.25 inches wide).

Grind smoothness is determined by the spacing between the cutting blades (e.g., the channel blades 302 and/or the milling blades 304). In certain embodiments, washers are used to space the channel blades 302 and/or the milling blades 304, where thicker washers provide a more corrugated grind finish, and thinner washers provide a smoother grind finish. In certain embodiments, spacer washers are provided on either side of the channel blades 302 (i.e., between the channel blades 302 and the milling blades 304).

Figure 3C:
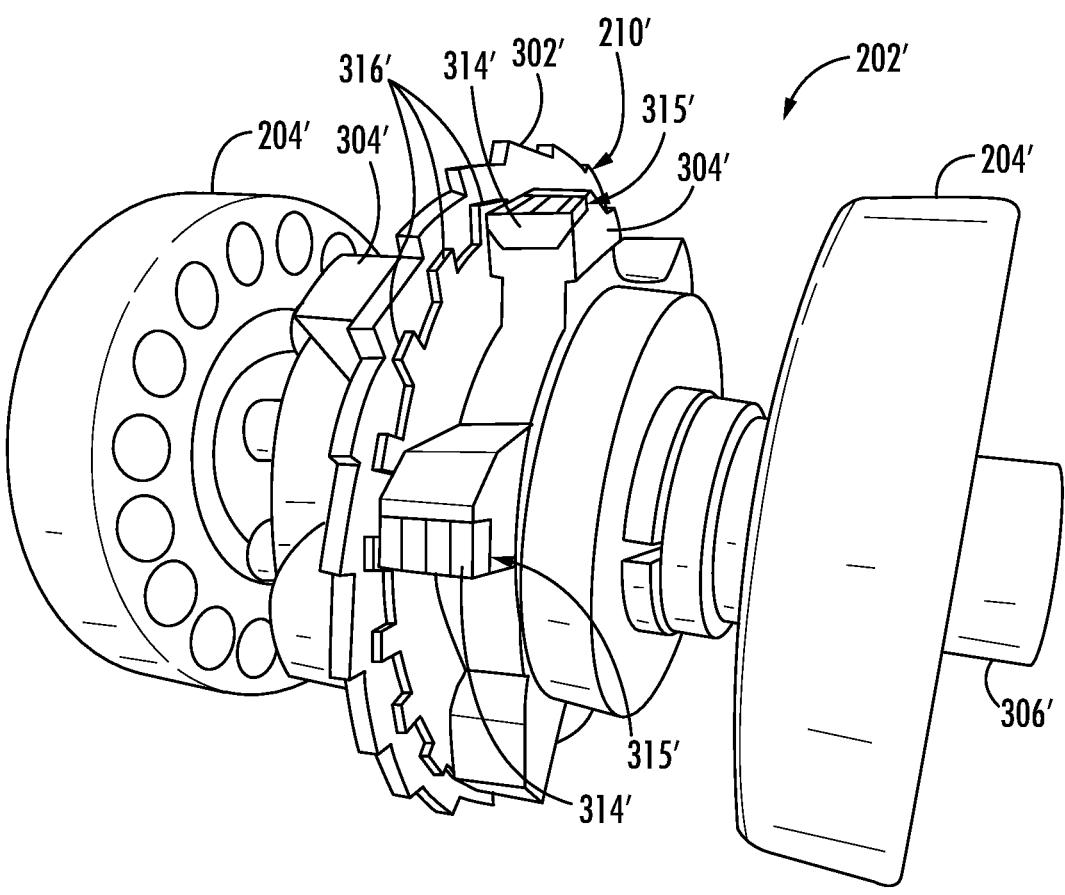
FIG. 3C is a side view of another embodiment of the grinding drum of FIGS. 2A-2B.

FIG. 3C is a side view of another embodiment of the grinding drum 202 of FIGS. 2A-2B. As similarly described above, the grinding drum 202' includes at least one channel blade 302' and a plurality of milling blades 304' is mounted on a blade axle 306'. In certain embodiments, the grinding drum 202' includes a pair of guides 204' mounted on opposing sides of blade set 210'. The pair of guides 204' is embodied as ball bearings 204' mounted to the blade axle 306'. The ball bearings 204' are configured to limit a grinding depth of the blade set 210'. The center of a rotation axis of the ball bearings 204' is aligned with the center of a rotation axis of the blade axle 306' and blade set 210'. In other words, the mill axis MA of the blade set 210' is aligned (e.g., horizontally and/or axially) with the guide axis GA of the ball bearings 204', such as within 10 mm. When the ball bearings 204' contact the road, an outer ring (e.g., steel) of the ball bearings 204' remain stationary, while an inner ring (e.g., steel) of the ball bearings 204' rotates with the blade axle 306' and the blade set 210'.

In certain embodiments, the at least one channel blade 302' and/or the plurality of milling blades 304' are tipped with polycrystalline diamond (PCD). For example, the teeth of the channel blade 302 include a PCD tip 312,' and the teeth of the milling blades 304' include a PCD tip 314'. PCD provides an improvement in durability compared to diamond-tipped blades, which wear along the edges, and may result in a rounded edge. Comparatively, PCD blades have been found to exhibit wear rates about 10% of that of diamond-tipped blades. Further, with PCD blades 302', 304', the grinding apparatus can grind at higher rotation speeds and/or higher translation speeds. In other words, with PCD blades 302', 304', the grinding apparatus can grind more accurate depths at faster grinding speeds. For example, in certain embodiments, the PCD blades 302', 304' grind at 60 ft/min with a resulting cut depth +/–0.005 inches, which provides 90% reduction in grind depth variation compared to diamond-tipped blades. In certain embodiments, the PCD blades 302', 304' grind at 200 ft/min, which is over ten times the grinding speed used with diamond-tipped blades. In certain embodiments, the PCD tips 314' are scalloped across a width of the milling blade 304. For example, the scallop may be in the shape of a sine wave. Further, the milling blade 304' includes a plurality of recesses 315 for mounting the PCD tip 314'.

In certain embodiments, the channel blade 302' includes chamfer teeth 316' at a side of the channel blade 302'. In particular, the chamfer teeth 316 are positioned at a radius more than that of the PCD tip 314' of the milling blades 304' and less than the PCD tip 312' of the channel blade 302'.

Figure 4A:
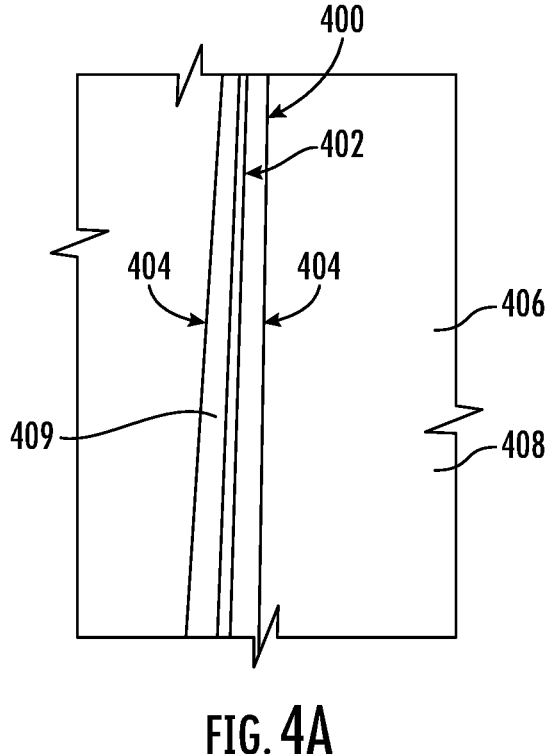
FIG. 4A is a perspective view of a nano-trench, including a channel and a recess milled by the grinding drum of FIGS. 3A-3C.

FIG. 4A is a perspective view of a nano-trench 400 including a channel 402 and recesses 404 (may also be referred to as a recessed area, milled recess, etc.) milled by the grinding drum 300, 300' of FIGS. 3A-3C. Use of the grinding drum 300, 300' provides for a single-pass process that symmetrically produces the channel 402 and the recesses 404 on either side of the channel 402 within a substrate 406. The channel 402 and the recesses 404 of the nano-trench 400 form a T-slot feature, although other shaped nano-trenches may be formed. The substrate 406 is milled to include a recess 404 that is wider than the channel 402, below an upper surface 408 of the substrate 406 the channel 402. The substrate 406 may be any type or of any material (e.g., asphalt, concrete, pavement, road, curb, walkway, bridge support, building base, etc.). Accordingly, the grinding drum 300, 300' (e.g., the PCD tips 312', 314') are used to create accurate depth and/or width of the channel 402 and/or recesses 404 of the nano-trench 400.

Figure 4B:
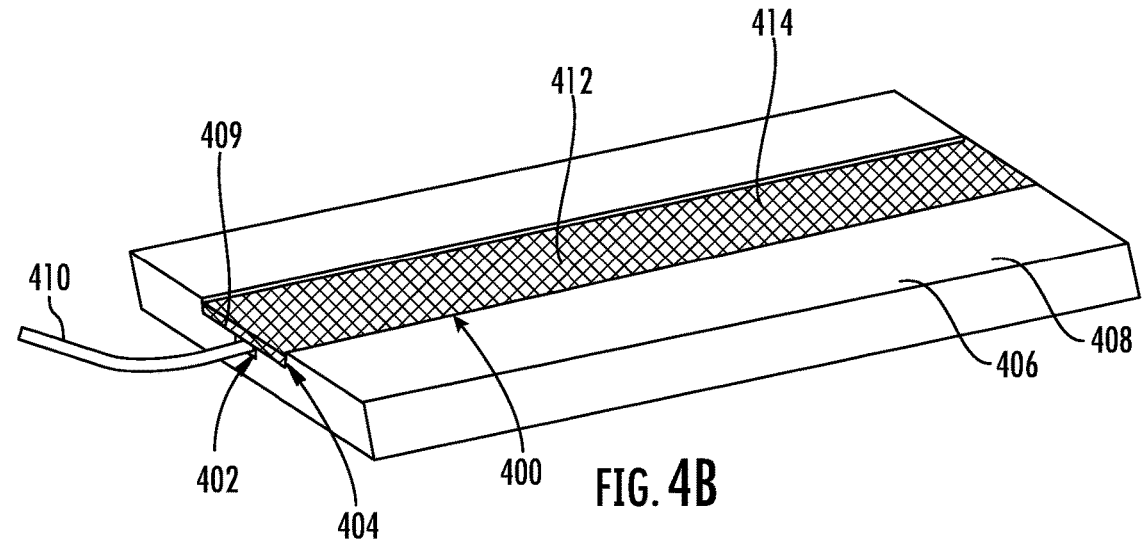
FIG. 4B is a perspective view of a distribution cable within the channel and cabling tape in the recess of the nano-trench of FIG. 4A.
Figure 4C:
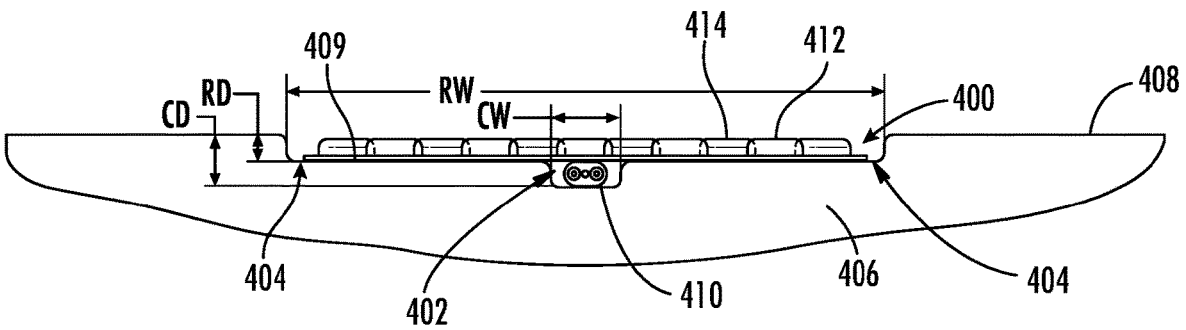
FIG. 4C is a cross-sectional side view of the cabling tape, distribution cable, and nano-trench of FIG. 4B.

FIGS. 4B-4C are views of a distribution cable 410 within the channel 402 and a cabling tape 412 in the recess 404 of the nano-trench 400 of FIG. 4A. Once the nano-trench 400 is formed, the distribution cable 410 is placed within the channel 402, and then the cabling tape 412 is placed in the recess 404 over the channel 402 and the distribution cable 410. Such work can be performed even if the substrate 406 is wet, as grinding exposes a new, dry surface for adherence of the cabling tape 412. The channel 402 protects the distribution cable 410, such as from road surface impact. The cabling tape 412 is durable and covers and protects the distribution cable 410. In certain embodiments, the channel 402 may be adhesive free or may include some amount of adhesive to hold the distribution cable 410 in place during deployment and/or to provide a water sealant and/or water blocking material.

The cabling tape 412 covers the distribution cable 410 and is adhered to the substrate 406 within the recess 404 such that an exposed upper surface 414 of the cabling tape 412 may sit substantially flush with or slightly below the upper surface 408 of the substrate 406. The cabling tape 412 is configured to adhere to the substrate 406. The cabling tape 412 may include an adhesive layer that is capable of adhering to the substrate 406. In certain embodiments, an adhesive compound may be applied to the substrate 406 separately from the cabling tape 412, such that the cabling tape 412 is pressed into the adhesive for bonding to the substrate 406.

The distribution cable 410 fits entirely within the channel 402, and the upper surface 414 of the cabling tape 412 is flush with or slightly below the upper surface 408 of the substrate 406. In certain embodiments, the depth of the recess 404 impacts contact with vehicle tires, which affects durability and lifetime of the cabling tape 412.

A channel width CW of the channel 402 and a recess width RW of the recess 404 are determined by grinding drum 200, 300, 300' (see FIGS. 2A-3C). Referring to FIGS. 3A and 4A-4C, the number of channel blades 302 used to form the channel 402 depends on the dimensions and/or orientation of the distribution cable 410. The number of milling blades 304 used to form the recess 404 depends on the width of the cabling tape 412. In other words, the width of the channel 402 can be adjusted by the number and/or width of the channel blades 302, and the width of the recess 404 can be adjusted by the number and/or width of the milling blades 304.

The profiles of the channel 402 and the recess 404 are slightly wider than the profiles of both the distribution cable 410 and the cabling tape 412, respectively. For example, in certain embodiments, the cabling tape 412 has a width of 0.5-4 inches, and the recess width RW of the recess 404 is at least 0.25 inches larger (e.g., between 1-6 inches). In certain embodiments, the channel width CW of the channel 402 may be 0.25-2 inches wide (e.g., to accommodate different sized fiber optic cables and/or orientations). The channel 402 and/or the recess 404 can be any size and/or shape to accommodate additional cable(s), and similarly, the recess width RW could be wider or narrower to accommodate any size and/or shape of the cabling tape 412.

The depth profile of the channel 402 and the recess 404 may be adjusted during milling, such as to maximize the protection of both the distribution cable 410 and cabling tape 412. In certain embodiments, a channel depth CD of the channel 402 from the lower surface 409 of the recess 404 to the upper surface 408 of the substrate 406 may be generally between 0.3 inches and 1 inch, and preferably about 0.35, 0.375, or 0.55 inches. A recess depth RD of the recess 404 from the lower surface 409 of the recess 404 to the upper surface 408 of the substrate 406 may be generally 0.1 inches to 0.5 inches, and preferably between 0.15 inches and 0.2 inches.

Figure 5A:
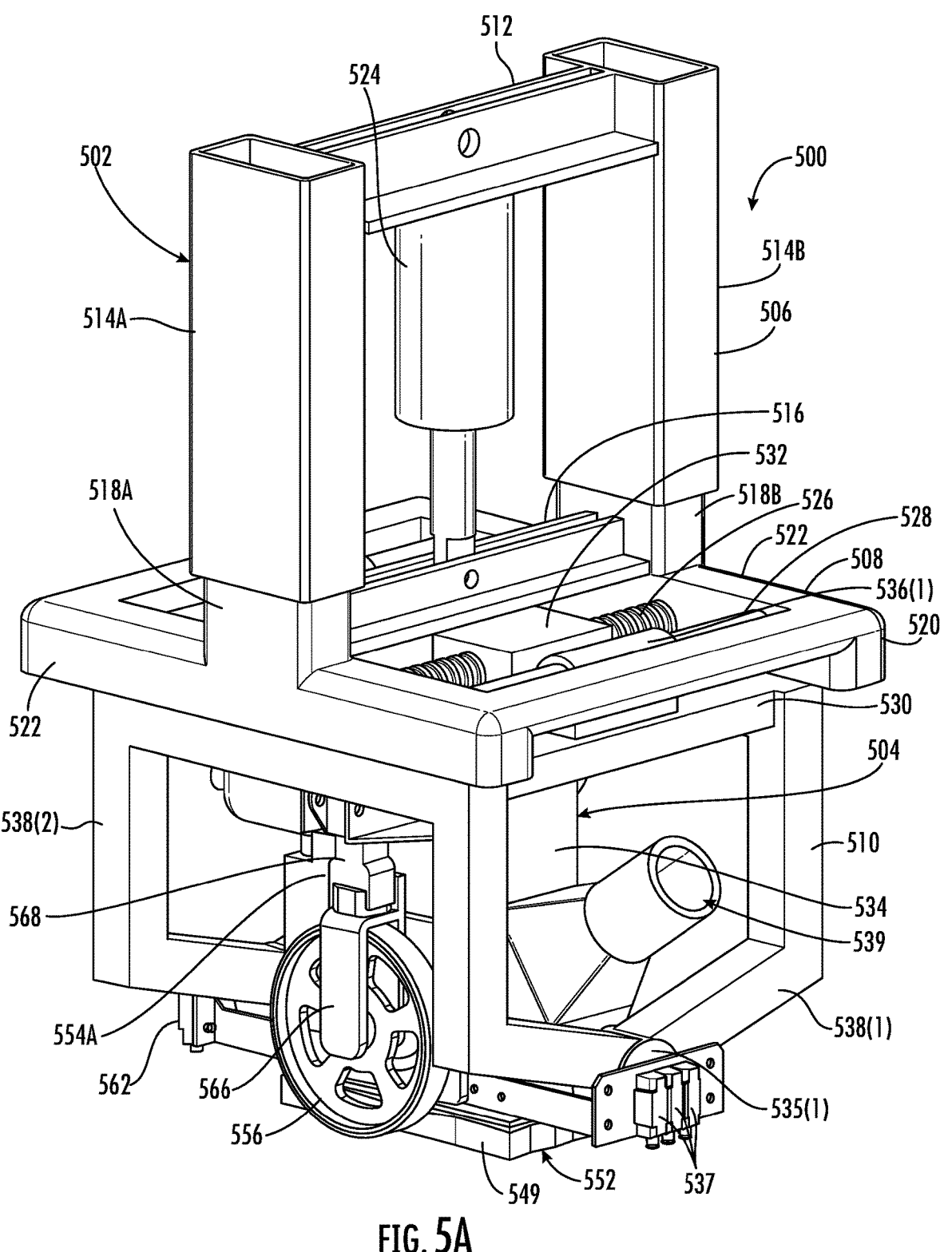
FIG. 5A is a front perspective view of a vehicle mounted grinding machine including a vehicle mount and a housing body.

FIG. 5A is a front perspective view of a vehicle mounted grinding machine 500 including a vehicle mount 502 and a grind head 504 (may also be referred to as a grinder, etc.). The vehicle mount 502 is attached to the grind head 504 and configured to attach the grind head 504 to a vehicle. The vehicle mount 502 includes an upper mount 506, an intermediate mount 508, and a lower mount 510, where the intermediate mount 508 is positioned between and coupled to the upper mount 506 and the lower mount 510. It is noted that in certain embodiments, the grinding machine 500 does not include a vehicle mount 502. For example, in certain embodiments, the grinding machine 500 is mounted to a trailer.

The intermediate mount 508 (as well as the lower mount 510) is configured to move vertically (vertically translate) relative to the upper mount 506. The upper mount 506 includes a cross-beam 512 with a first vertical sleeve 514A downwardly extending from a first end of the cross-beam 512 and a second vertical sleeve 514B downwardly extending from a second end of the cross-beam 512. Each of the first vertical sleeve 514A and the second vertical sleeve 514B (referred to generally as vertical sleeves 514) has a rectangular cross-section to prevent rotation of the upper mount 506 relative to the intermediate mount 508.

The intermediate mount 508 includes a cross-beam 516 with a first post 518A upwardly extending from a first end of the cross-beam 516 and a second post 518B upwardly extending from a second end of the cross-beam 516. Each of the first post 518A and the second post 518B (referred to generally as posts 518) has a rectangular cross-section to prevent rotation of the upper mount 506 relative to the intermediate mount 508. In particular, the posts 518 of the intermediate mount 508 are positioned within and move relative to the vertical sleeves 514 of the upper mount 506. The intermediate mount 508 further includes a lower frame 520 at a bottom of the posts 518 of the intermediate mount 508. The lower frame 520 is rectangular, with the posts 518 and cross-beam 516 extending across a middle of the lower frame 520. The posts 518 extend upwardly from a middle of sides 522 of the lower frame 520.

A constant force piston 524 (may also be referred to as a constant force cylinder) is connected to the cross-beam 512 (e.g., at a center thereof) of the upper mount 506 and the cross-beam 516 (e.g., at a center thereof) of the intermediate mount 508. The constant force piston 524 is configured to impart a constant downward force on the intermediate mount 508. In particular, the constant force piston 524 is configured to impart a constant extension force between the upper mount 506 and the intermediate mount 508 independent of the distance between the upper mount 506 and the intermediate mount 508.

Figure 5B:
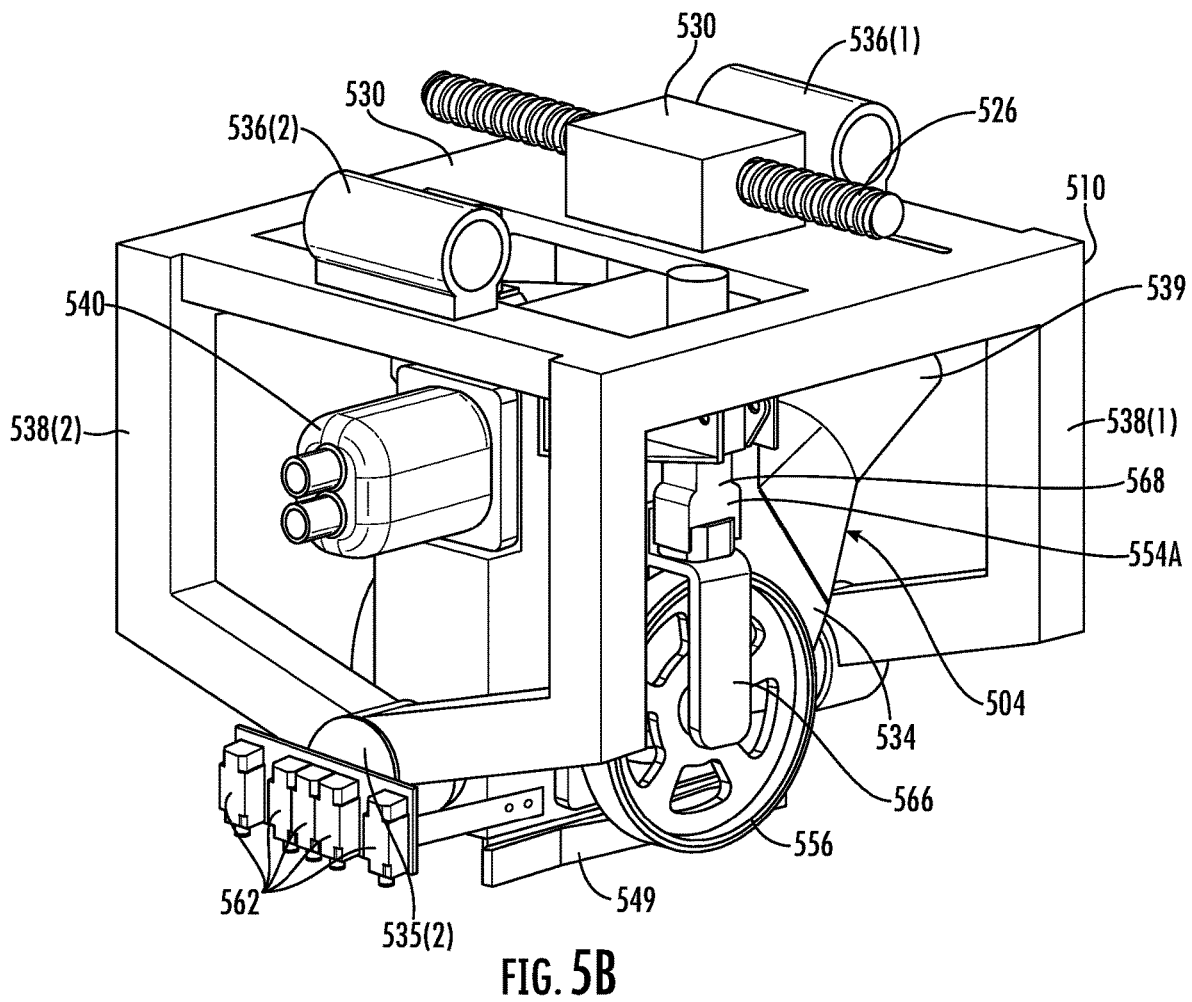
FIG. 5B is a back perspective view of a portion of the vehicle mount and the housing body of the vehicle mounted grinding machine of FIG. 5A.
Figures 5C, 5D:
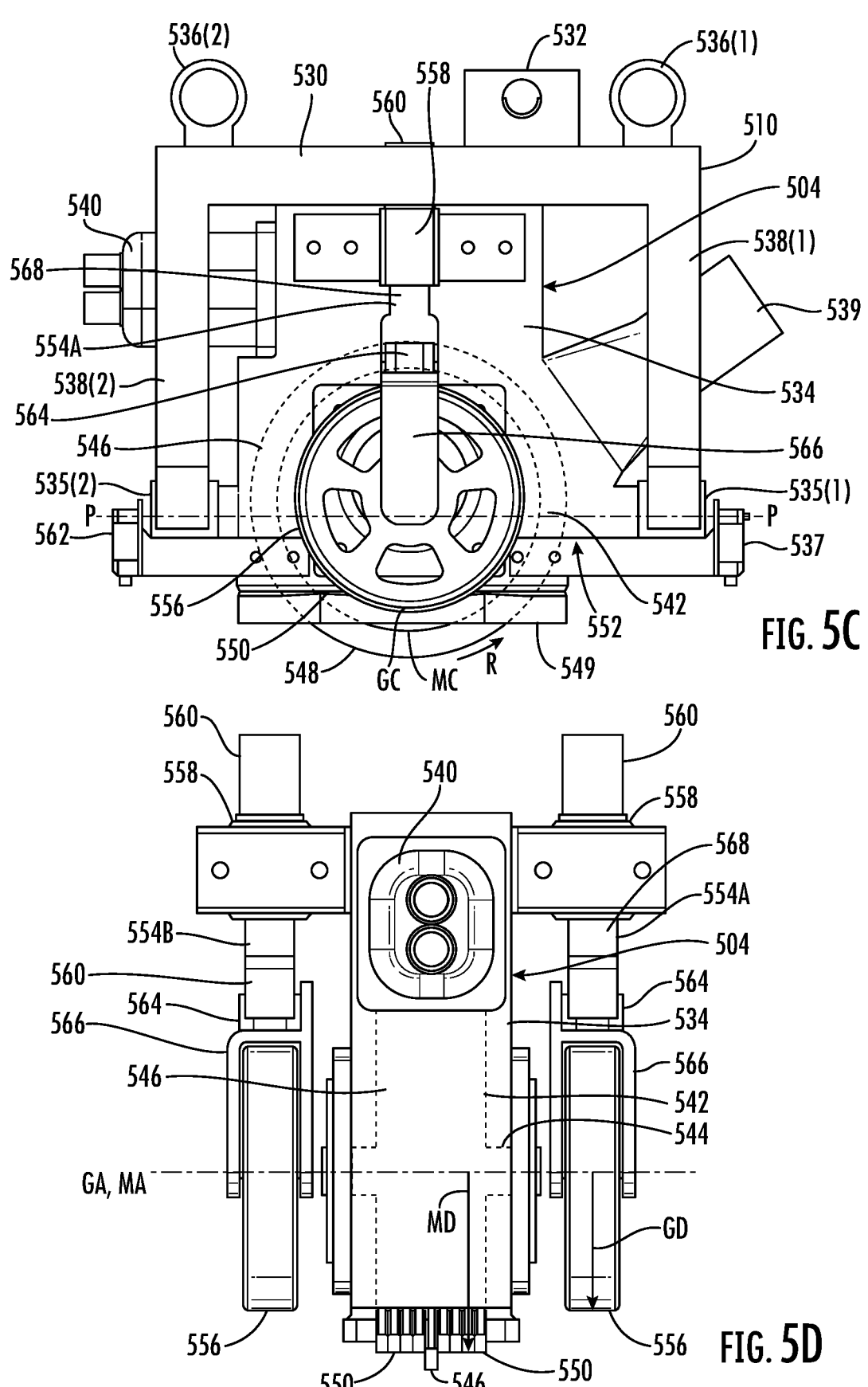
FIG. 5C is a side view of the portion of the vehicle mount and the housing body of the vehicle mounted grinding machine of FIG. 5B.
FIG. 5D is a back view of the housing body of the grinding machine of FIG. 5A.

Referring to FIGS. 5A-5C, the intermediate mount 508 includes a worm gear 526 and/or a horizontal rod 528 extending across the sides 522 of the lower frame 520 of the intermediate mount 508 to drive and/or support lateral movement of the lower mount 510 relative to the intermediate mount 508. In other words, the lower mount 510 is configured to move horizontally (laterally translate) relative to the intermediate mount 508 (and the upper mount 506).

The lower mount 510 includes a top frame 530 with an alignment motor 532 (e.g., a worm drive motor) attached to a top of the top frame 530 and mechanically coupled to the worm gear 526. The alignment motor 532 is configured to laterally translate a housing body 534 of the grind head 504 relative to the upper mount 506 (and vehicle) and perpendicular to a travel direction. The worm gear 526 remains stationary, and the alignment motor 532 moves relative thereto. In certain embodiments, the alignment motor 532 rotates the worm gear 526 instead, with the worm gear 526 extending through a stationary helical attachment. The lower mount further 510 includes a front horizontal sleeve 536(1) (may also be referred to as a frontward slide support) and a rear horizontal sleeve 536(2) (may also be referred to as a rearward slide support) extending from a top of the top frame 530 and positioned around the horizontal rods 528 for structural support and to distribute force (e.g., weight) across the top frame 530. The front horizontal sleeve 536(1) and the rear horizontal sleeve 536(2) are configured for free translation of the lower mount 510 relative to the intermediate mount 508.

The lower mount 510 includes front pivoting arms 538(1) downwardly extending from a front of the top frame 530 to a front pivot point 535(1), and back pivoting arms 538(2) downwardly extending from a back of the top frame 530 to a back pivot point 535(2). The lower mount 510 is pivotably attached to the grind head 504 by the front and back pivot points 535(1), 535(2). The grind head 504 pivots relative to the lower mount 510 about a pivot axis P extending through the front pivot point 535(1) and the back pivot point 535(2). In other words, the housing body 534 is rotatably attached to the lower mount 510. In particular, the housing body 534 is freely rotatable relative to the lower mount 510.

Referring to FIGS. 5A and 5B, the grinding machine 500 includes front sensors 537 attached to a front of the grind head 504 (e.g., in front of the front pivot point 535(1)). The front sensors 537 determine lateral deviation from a predetermined grinding path. The grinding machine 500 then operates the alignment motor 532 to laterally move the grind head 504 to correct for any such lateral deviation.

Referring to FIGS. 5A-5D, the grind head 504 includes the housing body 534, a vacuum port 539 at a front of the housing body 534, and a hydraulic motor connection 540 at a back of the housing body 534. The grind head 504 further includes a grinding drum 542 at least partially positioned within the housing body 534. The grinding drum 542 is mounted to and extends between sides of the housing body 534. As noted above, the grinding drum 542 includes an axle 544 and a blade set 546 mounted thereto, where the blade set 546 includes a channel blade 548 and milling blades 550 of the grinding drum 542 extending beyond a bottom of the housing body 534 to form the nano-trench 400 in the substrate 406. In certain embodiments, the blade set 546 includes at least one channel blade 548 and a plurality of milling blades 550 on opposing sides of the at least one channel blade 548. As noted above, rotation of the plurality of milling blades 550 defines a mill curvature and a mill radius about a mill axis.

A hydraulic motor rotates the grinding drum 542 (through the hydraulic motor connection 540) to grind the substrate 406. The grinding drum 542 rotates in direction R with the bottom of the blades 548, 550 moving forward. In other words, the grinding drum 542 grinds against the direction of travel, which facilitates grinding of the substrate 406 so that the grinding drum 542 cuts into the substrate 406 instead of pulling the grinding drum 542 over the substrate 406. Such a configuration propels dust and debris forward within the housing body 534. Accordingly, the vacuum port 539 is positioned at the front of the housing body 534 to better suction the debris and dust from within the housing body 534. The vacuum port 539 is configured for attachment to a vacuum via a vacuum tube.

The grind head 504 further includes a vacuum skirt 549 extending from the bottom of the housing body 534 and at least partially enclosing a bottom of the grinding drum 542. In particular, the vacuum skirt 549 extends along the sides and the front of the housing body 534, but not at the back of the housing body 534. Further, the vacuum skirt 549 is compressible to better form a seal between the housing body 534 and the substrate 406. The vacuum skirt 549 forms a seal to facilitate suction of debris from between the grinding drum 542 and the front of the housing body 534 while promoting airflow through the back of the housing body 534. In particular, the grind head 504 defines a vacuum area 552 positioned at the front of the grind head 504 defined by the bottom of the housing body 534, the grinding drum 542, and the vacuum skirt 549, where the vacuum port 539 suctions dust and debris created by the grinding drum 542.

Referring to FIGS. 5A-5D, the grind head 504 further includes a first guide assembly 554A attached to a first side of the housing body 534 and a second guide assembly 554B attached to a second side of the housing body 534 (opposite the first side). Each guide assembly 554A, 554B (referred to generally as guide assemblies 554) is configured to pivot the grind head 504 and/or limit a grinding depth of the grinding drum 542. The pair of guide assemblies 554 are on opposing sides of the blade set 546 of the grinding drum 542. As noted above, the pair of guide assemblies 554 limits the grinding depth of the grinding drum 542. Further, the narrow contact points of the guide assemblies 554 react to local changes in road contours better than wide stance machines. As the road contour changes horizontally, the guide assemblies 554 pivots the grind head 504 about the pivot axis P to maintain a grinding depth and shape of the grinding drum 542. In this way, the housing body 534 is configured to roll about a travel direction relative to the vehicle mount 502 to follow cross-road contour changes.

Each guide assembly 554 includes a wheel 556 defining a guiding curvature GC (which is concentric with or substantially concentric with the mill curvature MC) and a guiding radius GR about a guiding axis GA. The guiding radius GR of the wheels 556 is less than the milling radius MR of the milling blades 550 (and the channel radius of the channel blade 548). The pair of wheels 556 are on opposing sides of the blade set 546, with each of the wheels 556 horizontally aligned (from a front to a back) with the grinding drum 542. In certain embodiments, the grinding drum 542 is axially aligned with the pair of wheels 556 within 10 mm. Thus, the wheels 556 limit the grinding depth of the grinding drum 542. In certain embodiments, instead of wheels 556, each of the guide assemblies 554 includes at least one strip (may also be referred to as a ski, a shim, etc.), which may be made of metal. In certain embodiments, the mill axis of the grinding drum 542 is aligned with the guide axis of the pair of wheels 556 (e.g., within 10 mm).

The pivot points 535 are below the axle of wheels 556 to prevent the grind head 504 from tipping over (e.g., no matter how much lateral force is exerted by translation of the grind head 504 or turning of the grinding machine 500 around a radius). The low mount ensures lateral forces do not lift the wheels 556 of the guide assemblies 554 off the ground. Low center of gravity and pivot points 535 guarantee a nano-trench 400 that is orthogonal to the road surface at any given camber or small disruption in the road surface.

Each guide assembly 554 includes a height adjustment screw 558 and a height adjustment motor 560 to adjust a relative height of the wheel 556 to the grinding drum 542. Each height adjustment motor 560 of the guide assemblies 554 is independently operated.

In certain embodiments, there is one height adjustment motor 560 to adjust the relative heights of both wheels 556 of both guide assemblies 554. Adjusting the relative height of the wheels 556 relative to the grinding drum 542 adjusts the grinding depth of the grinding drum 542 and/or ensures that the nano-trench 400 is parallel to the road surface.

The grind head 504 includes the front sensors 537 attached to the front of the grind head 504 to determine lateral deviation of the grinding drum 542 from a predetermined grinding path. The grind head 504 also includes back sensors 562 attached to a back of the grind head 504 to measure a grinding depth of the grinding drum 542. Accordingly, the grind head 504 can operate the height adjustment motors 560 to adjust a relative height of the wheel 556 relative to the grinding drum 542 to adjust a grinding depth of the grinding drum 542. For example, as the blades 548, 550 wear, the wheel height can be retracted to adjust the grinding depth back to an original grinding depth. In other words, the grinding machine 500 includes at least one height adjustment motor 560 configured to adjust a height of the pair of wheels 556 relative to the grinding drum 542 to adjust the grinding depth to compensate for wear on the grinding drum 542. In certain embodiments, the grinding machine 500 includes two height adjustment motors 560, each of the two height adjustment motors 560 configured to independently adjust a height of one of the pair of wheels 556 relative to the grinding drum 542 to rotationally adjust orientation of the grinding drum 542 relative to a road surface. Further, the back sensors 562 can monitor the relative depths of the recess and the channel and thereby warn the operator when the wear of the channel blade 548 relative to the milling blade 550 is beyond a predetermined limit. This prevents the channel blade 548 from cutting a channel too shallow relative to the depth of the recess.

The constant force piston 524 is configured to impart a constant extension force on the housing body 534 and the grinding drum 542. Each guide assembly 554 further includes a load cell 564 positioned between a lower flange 566 and an upper arm 568. The wheel 556 is mounted to the flange 566, and the upper arm 568 is mechanically coupled to the height adjustment motor 560. The load cell 564 indicates a force exerted upon a bottom of the wheels 556, which determines whether a vehicle and the grind head 504 should proceed faster or slower. For example, if the load cell 564 detects a force equal to or greater than a predetermined limit, then that means the grinding drum 542 is bottoming out, and the vehicle can proceed faster. If the load cell 564 detects a force equal to or less than a predetermined limit (e.g., a force of zero), then that means the grinding drum 542 is not grinding deep enough, and the vehicle should proceed slower. In other words, the grinding machine 500 includes a pair of load cells 564 configured to measure a force exerted upon the pair of wheels 556 to determine adjustment of vehicle speed. The load cells 564 provide feedback to the operator so the grind speed can be optimized for the given material being ground while minimizing the downforce, thus prolonging blade life and minimizing the weight, size, and complexity of a heavy machine. Minimizing the load on the load cells 564 (but more than zero) ensures a set grind depth (because the blades are not lifting out of the road) while also allowing for the operator to maximize the vehicle speed.

In certain embodiments, the width of the lower mount 510 is between 7 and 28 inches (e.g., about 14 inches), the width of the spacing between the pair of wheels 556 is between 3 and 12 inches (e.g., about 6.5 inches), and/or the width of the housing body 534 is between 1 and 7 inches (e.g., about 3.3 inches). In certain embodiments, the length (from front to back) of the grinding machine 500, including the front sensors 537 to the back sensors 562, is about 7 to 30 inches (e.g., 14.5 inches) and/or the height from the bottom of the vacuum skirt 549 to a top surface of the top frame 530 of the lower mount 510 is between 6 and 25 inches (e.g., about 12.5 inches).

Figure 6:
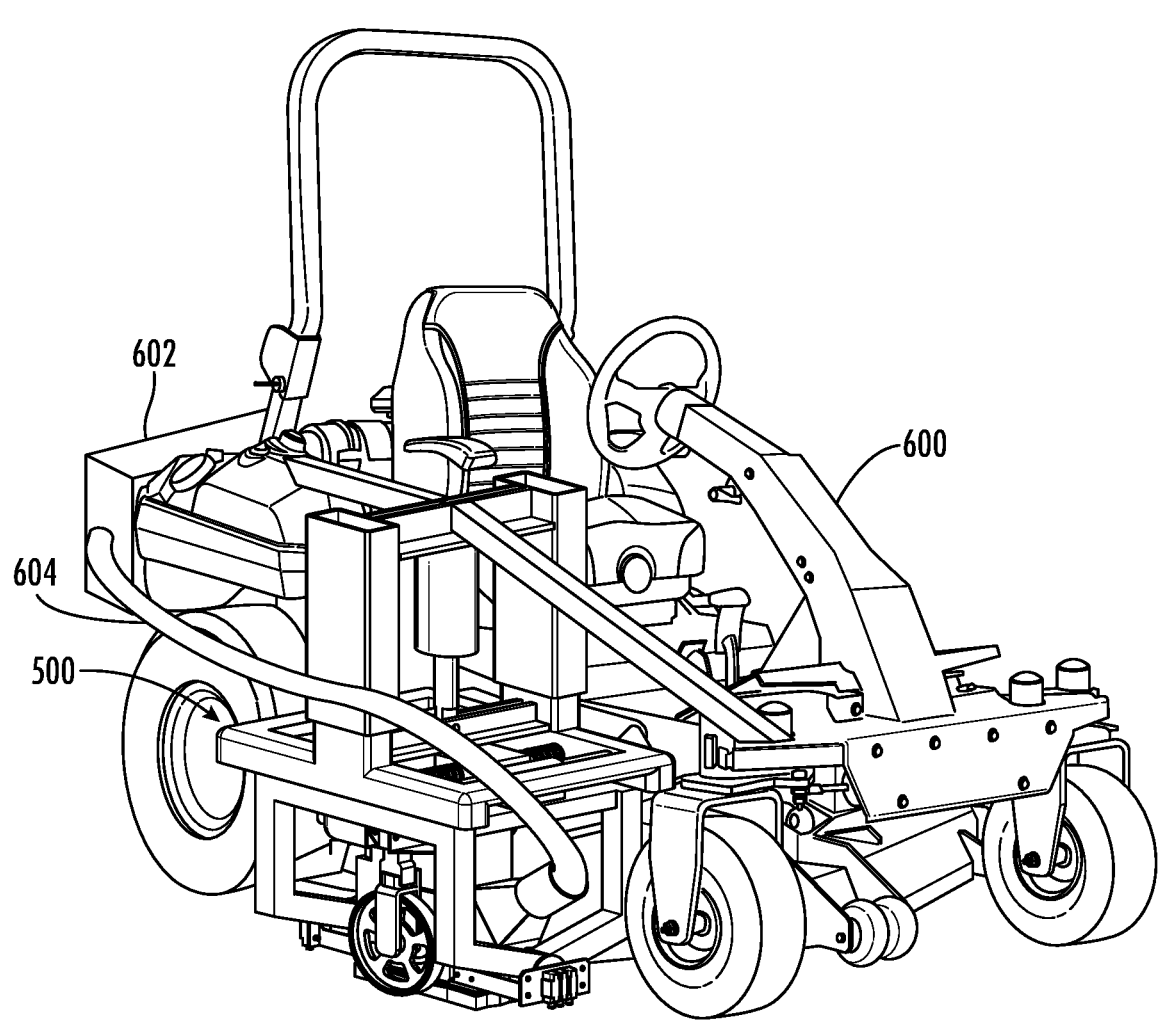
FIG. 6 is a perspective view of the vehicle mounted grinding machine of FIGS. 5A-5D mounted to a vehicle.

FIG. 6 is a perspective view of the vehicle-mounted grinding machine 500 of FIGS. 5A-5D mounted to a vehicle 600. The grind head 504 of the grinding machine 500 is in fluidic communication with a vacuum 602 via a vacuuming tube 604 to suction dust and debris created by the grinding machine 500. The vehicle mount 502 can be modified for mounting to many different types of vehicles 600 and is configured to grind long distances per day. In certain embodiments, the grinding machine 500, the hydraulic motor, and/or the vacuum 602 are powered by the vehicle 600 and/or batteries. The modular and compact design of the grinding machine 500 allows the grinding machine 500 to be switched in and out (reducing changeover time and/or maximizing blade use by mixing and matching blade sizes offline) and/or be mounted on small, maneuverable vehicles with precise and accurate speed control. Such vehicles may be more nimble in tight spaces (e.g., narrow city streets, alleys, and sidewalks). The overall size of the blades enables tighter turn radii because the radius of the blade does not carve out a wider slot when turning an arc like a larger blade set would.

Figure 7:
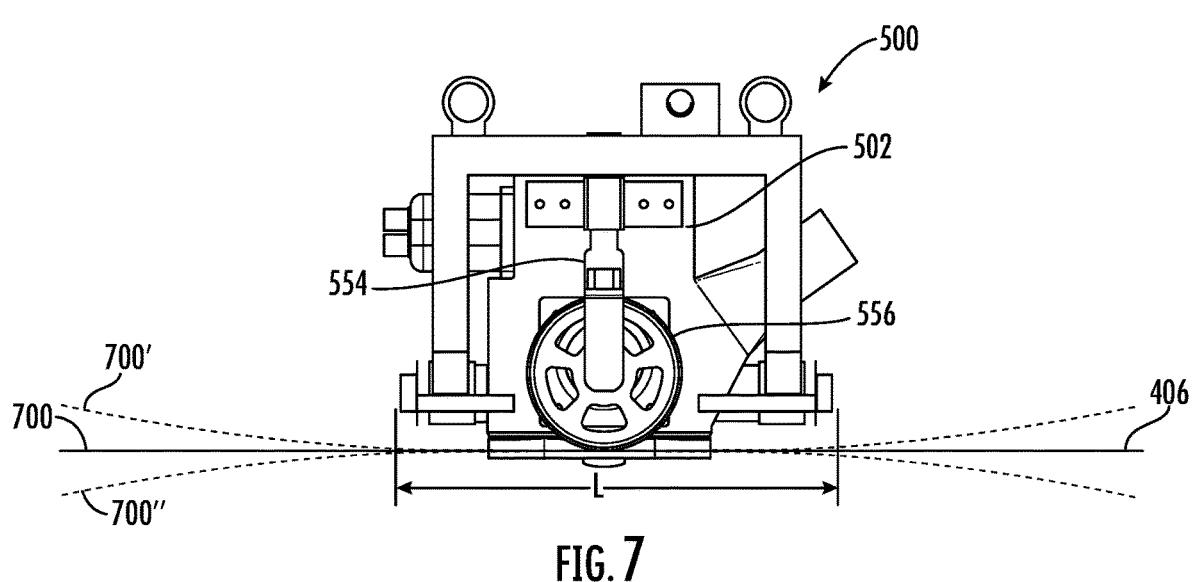
FIG. 7 is a side view of the grinding machine of FIGS. 5A-6 illustrating adjustment of the grinding machine to elevational variations in a substrate.

FIG. 7 is a side view of the grinding machine 500 of FIGS. 5A-6 illustrating adjustment of the grinding machine 500 to elevational variations in a substrate 406. The pair of wheels 556 of the guide assemblies 554 is configured to limit a grinding depth of the grinding drum 542. Positioning of the pair of wheels 556 along the MA of the grinding drum 542 maintains a consistent depth regardless of pavement contour. In particular, such a configuration maintains a grind of a desired depth when traveling over a flat surface 700, a valley 700', and/or a crest 700". The grinding machine 500 (without relying on front and back wheels for support during grinding) provides a consistent and precise nano-trench 400 (e.g., a consistent depth) over a wide variety of road contours or other terrain regardless of surface irregularities or variations (e.g., uneven surfaces, undulating surfaces, crests, valleys, road contours, curb contours, etc.). Further, the constant downforce of the constant force piston 524 allows the grind head 504 to float vertically to absorb down-road elevation changes relative to the vehicle 600, while the pivot allows the assembly to adapt to crossroad contours. Accordingly, the grind head 504 maintains contact with the substrate 406.

The overall length L of the grinding machine 500 determines the maximum down-road elevation changes (to prevent scraping). In certain embodiments, the maximum down-road elevation change is a down-road radius of about 50". The short length (front to back) of the grinding machine 500 allows the pivot point to be low while navigating extreme peaks and valleys of a road, such as those when passing through an intersection where the camber, curvature, and/or height of the two different road surfaces may be extreme.

Figure 8:
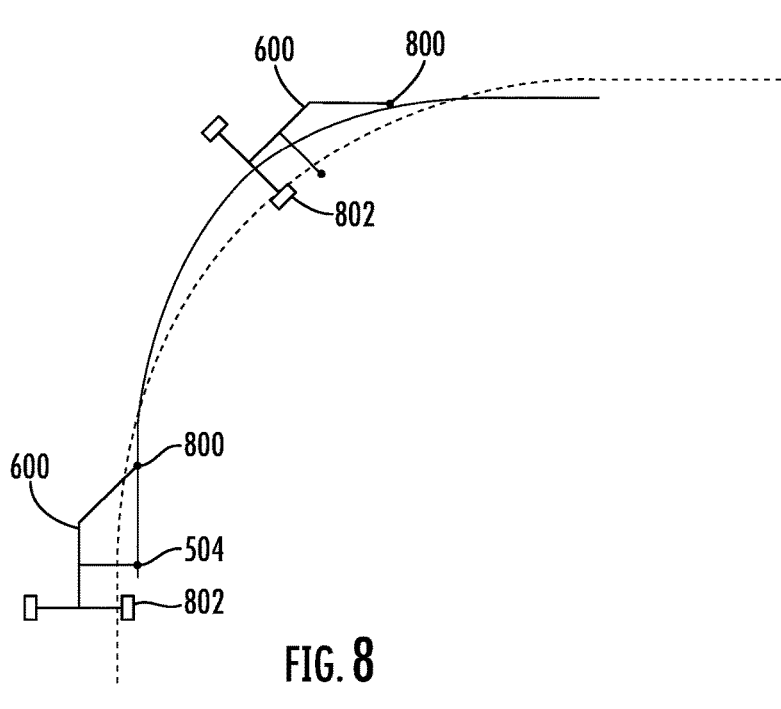
FIG. 8 is a diagram illustrating lateral adjustment of the grinding machine of FIGS. 5A-7 such as due to lateral deviations in a grinding path from vehicle operation.

FIG. 8 is a diagram illustrating lateral adjustment of the grinding machine of FIGS. 5A-7 such as due to lateral deviations in a grinding path from vehicle operation. A predetermined vehicle path may be indicated by a lead wire (or pointer) extended in front and to the side of the vehicle 600. However, a lead wire 800 must lead the vehicle and/or grinding machine 500 (see FIGS. 5A-7) to allow the operator to drive a straight line. A longer lead results in a straighter line but also a worse mismatch between paths of the vehicle 600 and the grinding machine 500 in a curve (for vehicles without rear steering). When navigating a turn, extending this distance puts the reference point farther and farther off the intended grind line, placing excessive responsibility on the vehicle operator to estimate the grind path. This results in inconsistent lines and arcs in the grind path. Among other problems, this may be distracting to drivers and/or be aesthetically displeasing.

The amount of translation of the grind head 504 for a given radius is related to the wheelbase of the vehicle 600 and the offset of the grind head 504 to inner wheels 802 of the vehicle 600. Translation of the grind head 504 relative to the vehicle 600 allows the grind head 504 to follow a pre-defined grind path that is independent of the wheelbase of the vehicle and turning radius of the vehicle 600 upon which the grinding machine 500 is mounted.

The grinding machine 500 disclosed herein removes responsibility and dependence upon a vehicle operator for improved consistency and quality of the nano-trench 400. Further, the grinding machine 500 automates control of grind depth, feedback of grind wear, line tracking (for consistent grind path), and/or feedback for speed control, etc. In particular, the grinding machine 500 provides feedback to precisely control the geometry of the nano-trench 400 (e.g., accounting for blade wear), maximize grind speed, and/or minimize the amount of material removed. The grinding machine 500 prevents over-grinding, which can be a safety factor for pedestrian or bicycle traffic, and in addition, the removal of excess material is costly, increases blade wear per linear foot, and/or can require a larger machine that is not as maneuverable in tight spaces (e.g., city spaces). The grinding machine 500 prevents under grinding, and/or prevents vulnerabilities in the cabling tape 412 and/or the fiber optic distribution cable 410. For example, exposure of the cabling tape 412 could make the cabling tape 412 and fiber optic distribution cable 410 more susceptible to damage by turning traffic, snowplows, trailer tailgates, etc.

The grinding machine 500 improves precision and/or accuracy for installation of fiber optic cables. In particular, the grinding machine 500 exerts an exact force, follows the contour of the crossroad and/or down road contour, monitors grind depth, adjusts for blade wear, optimizes grind speed based on blade and/or nano-trench geometry, adjusts for differences in turning radius (relative to the grind path), and provides automatic control and/or feedback to reduce operator input and responsibility producing more consistent results.

The constant force piston 524 on a linear slide allows the grinding machine 500 to adapt to down road contour while maintaining the required downforce to achieve the required grind geometry, independent of the wheelbase of the vehicle 600 upon which is the grinding machine 500 is mounted. Front sensors 537 follow the intended grind path and provide the ability to translate the grind head 504 side to side for automatic adjustments, which results in a more consistent path, improved aesthetic result, and less dependence on the operator, which reduces the skill set required. By providing a consistent grind, the cabling tape 412 over the distribution cable 410 is protected (e.g., from tire turns, snowplows, trailer tailgates, etc.), thereby making the fiber optic network more reliable and robust.

It will be apparent to those skilled in the art that various modifications and variations can be made without departing from the spirit or scope of the invention.

Further, as used herein, it is intended that terms "fiber optic cables" and/or "optical fibers" include all types of single-mode and multi-mode light waveguides, including one or more optical fibers that may be up coated, colored, buffered, ribbonized and/or have other organizing or protective structure in a cable such as one or more tubes, strength members, jackets or the like. Likewise, other types of suitable optical fibers include bend-insensitive optical fibers or any other expedient of a medium for transmitting light signals. An example of a bend-insensitive, or bend resistant, optical fiber is ClearCurve® Multimode fiber, commercially available from Corning Incorporated. Suitable fibers of this type are disclosed, for example, in U.S. Patent Application Publication Nos. 2008/0166094 and 2009/0169163.

Many modifications and other embodiments of the concepts in this disclosure will come to mind to one skilled in the art to which the embodiments pertain, having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A grinding machine, comprising:
a housing body;
a grinding drum comprising an axle and a blade set mounted thereto, the axle rotatably coupled to the housing body; and
a pair of guides on opposing sides of the blade set, each of the pair of guides horizontally aligned with the grinding drum;
a vehicle mount attached to the housing body, the vehicle mount configured to attach the housing body to a vehicle; and
a constant force piston attached to the vehicle mount and configured to impart a constant downward force on the housing body and the grinding drum.

2. The grinding machine of claim 1, wherein the grinding drum is axially aligned with the pair of guides within 10 mm.

3. The grinding machine of claim 1, further comprising at least one sensor positioned rearward of the grinding drum to measure a grinding depth of the grinding drum.

4. The grinding machine of claim 3, further comprising at least one motor configured to adjust a height of the pair of guides relative to the grinding drum to adjust the grinding depth to compensate for wear on the grinding drum.

5. The grinding machine of claim 1, further comprising two motors, each of the two motors configured to independently adjust a height of one of the pair of guides relative to the grinding drum to rotationally adjust orientation of the grinding drum relative to a road surface.

6. The grinding machine of claim 1, further comprising a pair of load cells configured to measure a force exerted upon the pair of guides to determine adjustment of vehicle speed.

7. The grinding machine of claim 1, wherein the blade set comprises at least one polycrystalline diamond-tipped blade.

8. A grinding machine, comprising:
a housing body;
a vehicle mount attached to the housing body, the vehicle mount configured to attach the housing body to a vehicle; and
a grinding drum comprising an axle and a blade set mounted thereto, the axle rotatably coupled to the housing body;
wherein the housing body is configured to roll about a travel direction relative to the vehicle mount;
wherein the vehicle mount includes a lower mount, the housing body rotatably attached to the lower mount;
wherein the vehicle mount includes an upper mount attached to the lower mount, the lower mount configured to laterally translate relative to the upper mount; and
wherein the vehicle mount includes an intermediate mount attaching the lower mount to the upper mount, the intermediate mount configured to vertically translate relative to the upper mount, the lower mount configured to laterally translate relative to the intermediate mount.

9. The grinding machine of claim 8, further comprising a pair of guides on opposing sides of the blade set, each of the pair of guides horizontally aligned with the grinding drum.

10. The grinding machine of claim 8, wherein the housing body is freely rotatable relative to the lower mount.

11. The grinding machine of claim 8, further comprising a constant force piston attached to the upper mount and the intermediate mount, the constant force piston configured to impart a constant downward force on the intermediate mount.

12. The grinding machine of claim 8, wherein the blade set comprises at least one polycrystalline diamond-tipped blade.

13. A grinding machine, comprising:
a housing body;
a vehicle mount attached to the housing body, the vehicle mount configured to attach the housing body to a vehicle;
a grinding drum comprising an axle and a blade set mounted thereto, the axle rotatably coupled to the housing body; and
an alignment motor configured to laterally translate the housing body relative to the vehicle mount and perpendicular to a travel direction;
wherein the vehicle mount includes a lower mount and an upper mount, the lower mount including a frontward slide support and a rearward slide support configured for free translation of the lower mount relative to the upper mount.

14. The grinding machine of claim 13, further comprising a worm gear coupled to the alignment motor to laterally translate the housing body relative to the vehicle mount.

15. The grinding machine of claim 13, further comprising at least one sensor positioned frontward of the grinding drum to determine lateral deviation from a predetermined grind path.

\* \* \* \* \*